United States Patent [19]

Kiffe

[11] Patent Number: 4,791,813

[45] Date of Patent: Dec. 20, 1988

[54] APPARATUS FOR THE MEASUREMENT OF THE ENERGY EXPENDITURE AT AN OPERATING MEMBER

[76] Inventor: Horst G. Kiffe, Vogelbeerweg 19, 7730 Villingen-Schwenningen, Fed. Rep. of Germany

[21] Appl. No.: 90,692

[22] Filed: Aug. 28, 1987

[30] Foreign Application Priority Data

Sep. 17, 1986 [DE] Fed. Rep. of Germany ....... 3631626

[51] Int. Cl.$^4$ .......................... A61B 5/22; G01D 9/00
[52] U.S. Cl. .................................... 73/379; 73/862.51
[58] Field of Search ............. 73/379, 380, 381, 862.51

[56] References Cited

U.S. PATENT DOCUMENTS 2,249,309 7/1941 Benko .................................. 73/381

Primary Examiner—Donald O. Woodiel
Attorney, Agent, or Firm—Leonard Bloom

[57] ABSTRACT

An apparatus for the measurement of the energy expenditure at an operating member, which for example is to be attached to the pedal of a bicycle or similar article. This device is particularly precise so that as small as desired flexing movements of an actuating member are transmitted through a control member to a movable control gear, which on its part is coupled with a mechanical counting mechanism measuring and summing the flexing movements. The transmittance can take place either through comb-like control springs of which the tongues are stubbed at the ends and which work together with the rim teeth of the control gear, or there can be included in the control gear a sensitive freewheel which transmits the flexing movements only in one direction.

9 Claims, 4 Drawing Sheets

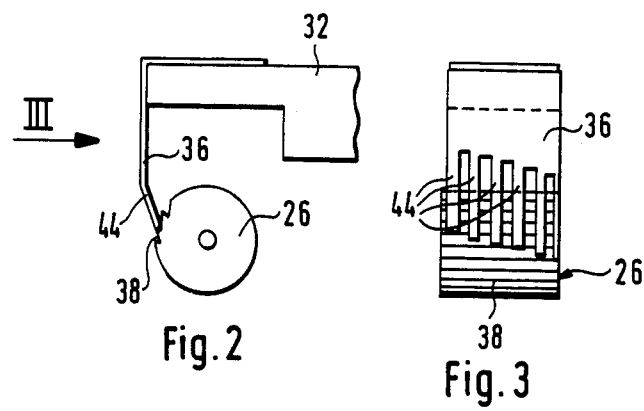
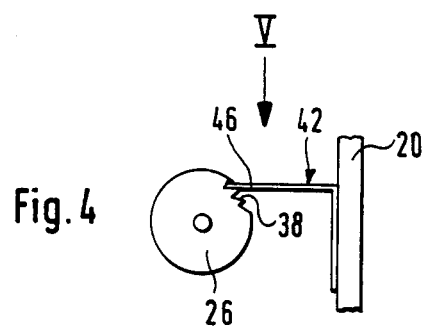
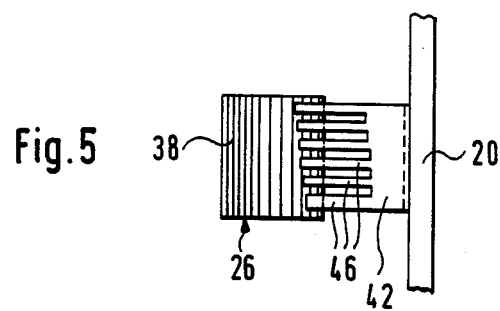

APPARATUS FOR THE MEASUREMENT OF THE ENERGY EXPENDITURE AT AN OPERATING MEMBER

FIELD OF THE INVENTION

The present invention concerns apparatuses for the measurement of energy which is expended at an operating member thereof.

BACKGROUND OF THE INVENTION

In DE-GM No. 85 05 266 there is disclosed a simple and inexpensively constructed, purely mechanically operated apparatus, which measures energy expended at an operating member that nevertheless achieves very dependable measurements. In that apparatus, the friction drive is provided by a friction wheel and friction member. Unfortunately, in such an arrangement, conditions of easily appearing slippage between the rubbing pieces, due to contamination or frictional wear, can falsify somewhat the measurement values.

A similar apparatus is known from DE-GM No. 82 03 421 by which the energy transfer to the counting mechanism results by means of a rack drive operating in combination with a ratchet for the prevention of a reverse rotation. However, this known solution has drawbacks in that it is comparatively expensive to construct and, further in that flexing movements of the operating member, which would only cause an additional rotation of the control gear smaller than the angular separation of two ratchet teeth of the ratchet gear in the ratchet, are lost. The measurements made thereby are, for this reason, not quite precise.

Thus, it can be seen that there remains a need for an apparatus of the type described, so that a more precise measurement of the energy expended at the operating member is made possible, whereby nevertheless the simple and inexpensive mechanical construction of the apparatus are maintained.

Accordingly, it is a primary goal of the present invention to provide a mechanical transmission system which realizes the concepts of the invention so there is achievable a precise as desired transmittance of the flexing movement.

In accordance with the teachings of the present invention a comb-shaped control spring is provided having tongues of differing lengths. As the control spring can be subdivided into tongues as thin as desired, as small as desired flexing movements can be transmitted herewith.

In further accordance with the teachings of the present invention, a reverse rotation of the control gear can be prevented by means of a second comb-shaped control spring that can be divided into tongues which are as this as desired.

In yet further accordance with the teachings of the present invention, the comb-like springs may be finely terminated at the ends of the tongues, whereby the fineness of this adjustment can be chosen as desired.

In still yet further accordance with the teachings of the present invention, the control gear includes a freewheel which transmits the finest flexing movements of the actuating member, yet immediately interrupts the transmittance during a reverse rotation. The actuating sensitivity of this freewheel can also be adjusted as desired by easy steps of the tradesman.

And in yet further accordance with the teachings of the present invention, the transmittance of the energy from the control member to the outer housing of this freewheel is provided either, by means of a friction transmission, or by means of an integral coupling of the control member and control gear, whereby the latter coupling is insignificantly more costly yet more dependable.

BRIEF DESCRIPTION OF THE DRAWINGS

FIG. 2 is a side view of a portion of the device of FIG. 1.

FIG. 3 is a view taken along line III of FIG. 2.

FIG. 4 is a side view of another portion of the device of FIG. 1.

FIG. 5 is a view taken along line V of FIG. 4.

BRIEF DESCRIPTION OF PREFERRED EMBODIMENTS

Figure 1:
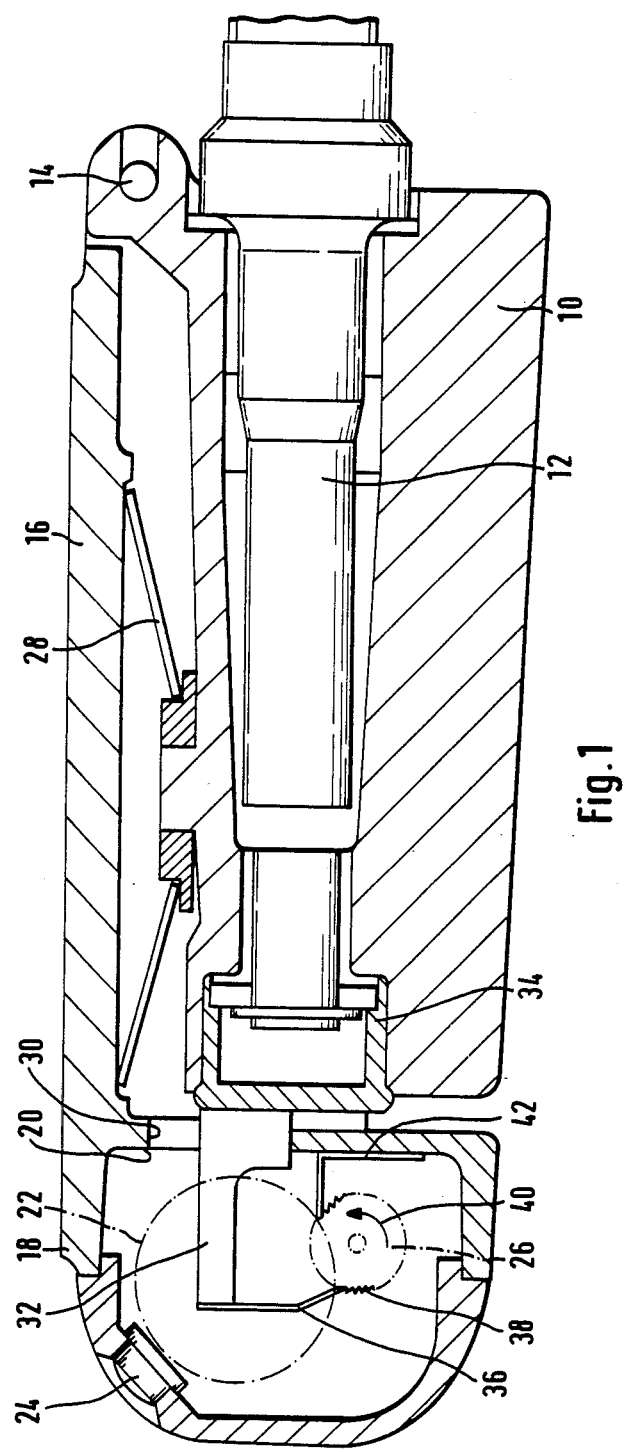
FIG. 1 is a schematic axial cross-section view of the apparatus in accordance with the invention which is joined to a pedal shaft.

Referring now to the drawings wherein in all figures, the same reference marks are used for the same or corresponding parts.

In the first prototype presented in FIGS. 1 through 5, a housing generally referenced as 10 is fastened to the pedal shaft 12 of a bicycle pedal or similar article. This housing has a one end and a second opposite end. Movable (pivotably) around an axis 14 fixed to the second end housing, is the second end of a generally flat operating member 16 that is situated (positioned) on and pivotably secured about a pivot point to the housing 10 along its top for pivotal movement in a first and second opposite directions. At the freely swinging end (the first end) 18 of the operating member, a chamber-like measuring compartment 20 is provided (being carried thereby) which contains a means for displaying the energy expenditure including a mechanical counting mechanism 22, schematically indicated by a dotted line, which is readable through a viewing window 24. In a known and not further shown manner, the counting mechanism 22 can be driven from a control gear 26 through a control transmission device.

A leaf spring (actuating spring) 28, the flexing movements of which are to be measured and summed during energy exertion (the expenditure of energy) upon the operating member 16, is propped (resiliently biased) as an actuating member in a known manner between the operating member 16 and the housing 10 for constantly biasing the operating member away from the housing in the second opposite direction away from the housing. In this matter, all energy expenditures on the operating member pivotably moves the operating member in the first direction producing resiliently compression of the actuating spring through a vertical slit 30 of the measuring chamber 20 protrudes a support 32 which is rigidly attached through a cap 34 with the housing 10 and the pedal shaft 12. At the free end (the first end) of the support 32 (carried by the first end of the housing 10)

and approximately perpendicular to its length is attached a protruding control spring (control member) 36. The free end of the control spring 36 works together (comes into engagement with) with the rim teeth 38 of the control gear 26 in order to rotate (drive) the control gear 26 in the direction of the arrow 40, whereby the energy expenditure is measured. A ratchet spring 42, attached to the wall of the measuring compartment 20, engages in the teeth 38 along the stop-direction opposite to the arrow 40.

As can be seen in FIGS. 3 and 5, both the control spring (control member) 36 and the ratchet spring 42 are formed comb-like, whereby the tongues 44 and 46, respectively, of both springs have varying lengths. In the prototype shown, the ends of the tongues 44 and 46, respectively, are slightly stubbed perpendicular to their lengths, whereby one tongue always engages precisely in a tooth of the rim teeth 38 and, therewith, accomplishes a very accurate transmittance of the energy expenditure received on the operating member through the control spring 36, and a ratchet action through the ratchet spring 42. If desired, the width of the two springs 36 and 42 and, correspondingly, also the axial length of the rim teeth 38 can be formed so as to be as large as desired, and as the tongue subdivision and stubbing can be chosen to be as fine as desired. Such an arrangement makes it possible to provide an energy measurement which is as fine as desired while being largely independent of contamination and wear.

Figure 6:
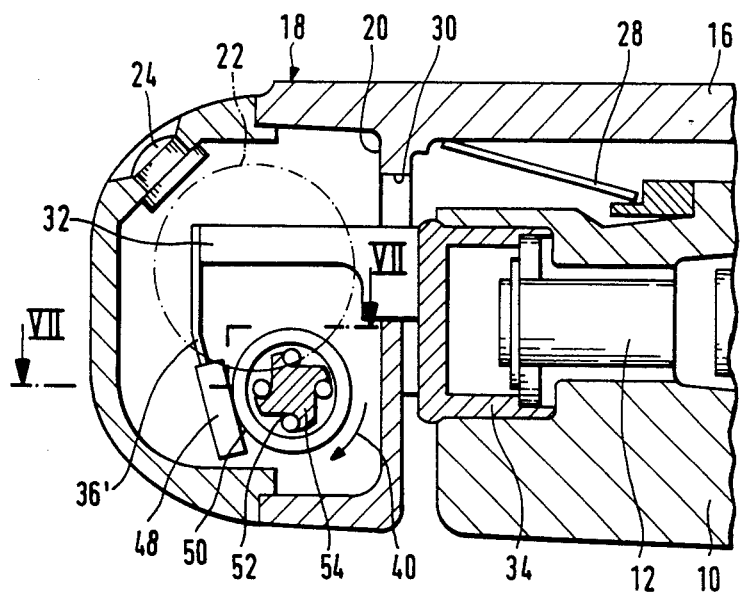
FIG. 6 is a schematic axial cross-section view of a second prototype of the apparatus according to the invention.
Figure 7:
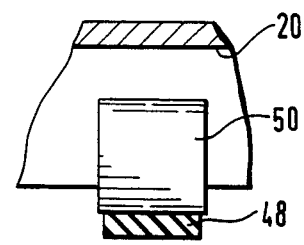
FIG. 7 is a cross-section view taken along the lines VII—VII of FIG. 6.

With the second prototype of the invention shown in FIGS. 6 and 7, a block-like friction member 48 is attached to the free end (one end) of the control spring (control member) 36', which is pressed in a rubbing arrangement against the control gear and, in particular, against the circumference of a ring-shaped outer housing 50 of a freewheel generally referenced as 52. The relative movements between the operating member 16 and the support 32 are thereby transmitted to the outer housing 50 by friction. During the rotation of the outer housing 50 in the direction of the arrow 40, the freewheel takes along with it the inner axle 54, whereas during the rotation of the outer housing 50 in the direction opposite to the arrow 40, the inner axle releases. The freewheel 52 can at any time be adjusted by the tradesman so that by even the smallest relative movements it transmits the energy expended on the operating member in the direction of the arrow 40, and in the opposite direction suppresses it. The control gear formed by the freewheel 52 with outer housing 50 and inner shaft 54 transmits the expended energy in the direction of the arrow 40 to the counting mechanism 22 in the above depicted manner.

Figure 8:
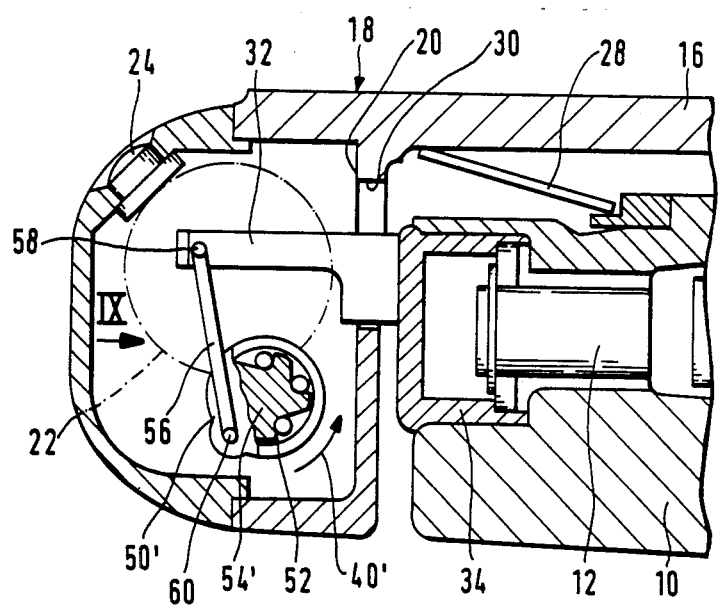
FIG. 8 is a schematic axial cross-section view of a third prototype of the apparatus according to the invention.
Figure 9:
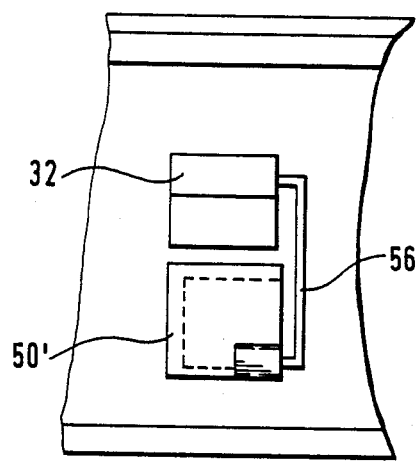
FIG. 9 is a view taken along line IX of FIG. 8.

In the third prototype shown in FIGS. 8 and 9, the control gear is similarly formed from a freewheel 52' with outer housing 50' and inner shaft 54'. The energy transmittance (energy expenditure) upon the operating member results here, though, in the opposite direction in accordance with arrow 40. With this prototype, a push rod 56 is attached at one end to the support 32 to be movable around an axis 60. The energy transmittance from the support 32 to the outer housing 50 results here forcibly, so that a slipping is yet more assuredly excluded than with the prototype according to FIGS. 6 and 7.

I claim:

1. Apparatus for measuring the energy expenditure at an operating member in contact with an actuating member in the form of a spring, of which the flexing movements are transmitted through a transmission assembly to a mechanical counting device, summed by it and displayed in energy units, wherewith the transmission assembly includes a control member which works together with a control gear driving the counting device, of which the reverse motion is hindered by a ratchet device thereby characterized in that through the control member as small as desired flexing movements of the actuating member are transmittable to the control gear moving the control gear, such that the control gear engages the control member rotating the control gear, driving the counting device and displaying the energy expenditure in energy units.

2. Apparatus for measuring the energy expenditure at an operating member in contact with an actuating member in the form of a spring, of which the flexing movements are transmitted through a transmission assembly to a mechanical counting device, summed by it and displayed in energy units, wherewith the transmission assembly includes a control member which works together with a control gear driving the counting device, of which the reverse motion is hindered by a ratchet device thereby characterized in that through the control member as small as desired flexing movements of the actuating member are transmittable to the control gear, further characterized in that the control gear includes teeth into which is engaged at any given moment a tongue of the control member, constructed as a comb-shaped control spring, whereby the tongues are of varying lengths.

3. The apparatus of claim 2, further characterized in that the ratchet mechanism includes a comb-like ratchet spring into which, at any given moment, a tongue engages into the teeth of the control gear in the stop-direction, whereby the tongues are of varying lengths.

4. Apparatus for measuring the energy expenditure at an operating member in contact with an actuating member in the form of a spring, of which the flexing movements are transmitted through a transmission assembly to a mechanical counting device, summed by it and displayed in energy units, wherewith the transmission assembly includes a control member which works together with a control gear driving the counting device, of which the reverse motion is hindered by a ratchet device thereby characterized in that through the control member as small as desired flexing movements of the actuating member are transmittable to the control gear, further characterized in that the ratchet mechanism includes a comb-like ratchet spring into which, at any given moment, a tongue engages into the teeth of the control gear in the stop-direction, whereby the tongues are of varying lengths.

5. The apparatus of one of claims 2, 4 or 3, further characterized in that the ends of the tongues are uniformly stubbed-off perpendicular to the length of the tongues.

6. Apparatus for measuring the energy expenditure at an operating member in contact with an actuating member in the form of a spring, of which the flexing movements are transmitted through a transmission assembly to a mechanical counting device, summed by it and displayed in energy units, wherewith the transmission assembly includes a control member which works together with a control gear driving the counting device, of which the reverse motion is hindered by a ratchet device thereby characterized in that through the control member as small as desired flexing movements of the actuating member are transmittable to the control gear, further characterized in that the control gear includes a freewheel with an outer housing and the inner shaft preventing the transmittance of a reverse rotation to the counting device whereby the outer housing with the control member and the inner shaft is coupled to the counting device.

7. The apparatus of claim 6, further characterized in that the control member includes a friction member which contacts the outer housing of the freewheel formed as a friction wheel.

8. The apparatus of claim 6, further characterized in that the control member is integrally connected to the outer housing of the freewheel.

9. An apparatus for measuring and displaying energy expenditure, said apparatus comprising:
   a housing having a first and a second ends, the housing further having a control member carried on the one end thereof;
   an operating member for receiving the energy expenditure thereon, said operating member having a first and a second ends, the second end of the operating member being pivotably secured to the second end of the housing about a pivot point for pivotal movement in a first and a second opposite directions;
   an actuating spring resiliently biased between the housing and the operating member for constantly biasing the operating member away from the housing in the second opposite direction, such that all energy expenditures on the operating member pivotably moves the operating member in the first direction producing resilient compression of the actuating spring;
   a control gear carried on the one end of the operating member, such that movement of the operating member and resilient compression of the actuating spring in response to the energy expenditure on the operating member moves the control member, thereby driving the control gear, whereby the energy expenditure is measured; and
   means for displaying the energy expenditure measured by the control gear.

* * * * *